US008544630B2

(12) United States Patent
Schutzmann et al.

(10) Patent No.: US 8,544,630 B2
(45) Date of Patent: Oct. 1, 2013

(54) METHOD AND DEVICE FOR TESTING VALUE DOCUMENTS

(75) Inventors: Jurgen Schutzmann, Pfaffenhofen (DE); Elisabeth Paul, Raubling (DE); Wolfgang Rauscher, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 13/393,432

(22) PCT Filed: Aug. 31, 2010

(86) PCT No.: PCT/EP2010/062681
§ 371 (c)(1),
(2), (4) Date: Feb. 29, 2012

(87) PCT Pub. No.: WO2011/026829
PCT Pub. Date: Mar. 10, 2011

(65) Prior Publication Data

US 2012/0160632 A1 Jun. 28, 2012

(30) Foreign Application Priority Data

Sep. 1, 2009 (DE) ........................ 10 2009 039 588

(51) Int. Cl.
*G07D 7/04* (2006.01)
*G06K 7/08* (2006.01)

(52) U.S. Cl.
USPC .............. 194/302; 194/214; 235/449; 283/82

(58) Field of Classification Search
USPC ................ 194/302, 320, 214; 235/449, 450; 324/200, 228, 232; 382/135, 137, 139, 320; 209/534; 283/82
See application file for complete search history.

(56) References Cited

U.S. PATENT DOCUMENTS

| | | | |
|---|---|---|---|
| 2009/0008922 | A1 | 1/2009 | Schutzmann et al. |

FOREIGN PATENT DOCUMENTS

| | | | |
|---|---|---|---|
| DE | 2834287 | | 2/1980 |
| DE | 102004049999 | A1 | 4/2006 |
| EP | 0428779 | A1 | 5/1991 |
| GB | 2130414 | A | 5/1984 |
| WO | 2009090676 | A1 | 7/2009 |
| WO | 2009103352 | A1 | 8/2009 |
| WO | WO 2009/103352 | A1 * | 8/2009 |

OTHER PUBLICATIONS

German Search Report dated Sep. 1, 2009 for DE 10 2009 039 588.1.
International Search Report dated Dec. 10, 2010 for PCT/EP2010/082681.

* cited by examiner

*Primary Examiner* — Mark Beauchaine
(74) *Attorney, Agent, or Firm* — Bacon & Thomas, PLLC

(57) ABSTRACT

The invention relates to a method and an apparatus for checking documents of value which have a security element with several magnetic areas, including at least one high-coercive magnetic area, at least one low-coercive magnetic area and at least one combined magnetic area which contains both the high-coercive and the low-coercive magnetic material. After the magnetization of all magnetic areas in a first direction, first magnetic signals of the security element are detected with a first magnetic detector. After a subsequent second magnetizing, which is effected antiparallel to the first magnetizing and magnetically reverses only the low-coercive magnetic material, second magnetic signals of the security element are detected. For identifying the magnetic areas, the second magnetic signals or a signal derived therefrom are compared with two thresholds.

18 Claims, 4 Drawing Sheets

METHOD AND DEVICE FOR TESTING VALUE DOCUMENTS

BACKGROUND OF THE INVENTION

A. Field of the Invention

The invention relates to a method and an apparatus for checking documents of value, such as e.g. bank notes, checks, cards, tickets, coupons.

B. Related Art

From the prior art it is known to provide documents of value with security elements, such as security strips or also security threads, which contain magnetic material. The magnetic material here can be applied onto the security element either continuously or only in certain areas, for example in the form of a coding. For the magnetic coding of a security element there is used for example a certain sequence of magnetic and non-magnetic areas, which is characteristic of the type of the document of value to be secured. Furthermore, it is known to use different magnetic materials for a magnetic coding, for example with different coercive field strengths. In the hitherto known magnetic codings there are used for example two differently coercive magnetic materials, from which there are formed two types of magnetic areas which can be arranged side by side or one above the other.

Further, it is known to automatically check bank notes having security threads, which have a magnetic coding of differently coercive materials. Here, the bank notes are transported parallel to the course of the security element, and one after the other first go through a strong magnetic field parallel to the transport direction, which magnetizes both the high-coercive and also the low-coercive magnetic areas along the transport direction. The remaining magnetization is checked by means of an inductive magnetic head which is sensitive exclusively parallel to the transport direction. Then the bank notes go through a weaker magnetic field perpendicular to the transport direction, which aligns only the low-coercive magnetic areas perpendicular to the transport direction, while the high-coercive magnetic areas remain magnetized in the transport direction. Anew, the remaining magnetization is checked by means of an inductive magnetic head which is sensitive exclusively parallel to the transport direction. With the first inductive magnetic head here the high- and the low-coercive magnetic areas are detected and with the second inductive magnetic head only the high-coercive magnetic areas are detected. If the security element, however, also contains combined magnetic areas, which contain the two differently coercive magnetic materials, so that the differently coercive magnetic materials at the same time reach the detection range of the magnetic detector, an overlay of the magnetic signals of the differently coercive magnetic materials is detected. The combined magnetic areas here deliver a reduced magnetic signal whose signal swing lies between that of the high-coercive and that of the low-coercive magnetic areas. A disadvantage of this method is that these combined magnetic areas can be distinguished only with difficulties from the high-coercive and from the low-coercive magnetic areas.

The invention is therefore based on the object to carry out the check of the documents of value in such a way that the high-coercive, the low-coercive and the combined magnetic areas respectively can be reliably distinguished from each other.

SUMMARY OF THE DISCLOSURE

The document of value to be checked has a security element with several magnetic areas. The magnetic areas include at least one high-coercive magnetic area of a high-coercive magnetic material with a first coercive field strength and at least one low-coercive magnetic area of a low-coercive magnetic material with a second coercive field strength which is lower than the first coercive field strength, and at least one combined magnetic area which has both the high-coercive and the low-coercive magnetic material. For example, the at least one high-coercive, the at least one low-coercive and the at least one combined magnetic area on the security element respectively are spaced apart from each other by non-magnetic areas lying therebetween.

The at least one combined magnetic area contains both the high-coercive and the low-coercive magnetic material. The combined magnetic area preferably contains a smaller quantity of the high-coercive magnetic material than the high-coercive magnetic area and a smaller quantity of the low-coercive magnetic material than the low-coercive magnetic area. In particular, the combined magnetic area is configured in such a way that the high-coercive and the low-coercive magnetic material of the combined magnetic area have substantially the same remanent flux density. For example, the combined magnetic area contains the same quantity of the high-coercive magnetic material and of the low-coercive magnetic material. In particular, the high-coercive and the low-coercive magnetic material of the combined magnetic area are disposed on each other. Alternatively, the combined magnetic area may contain the high-coercive and the low-coercive magnetic material also in the form of a material mixture.

The high-coercive magnetic material of the high-coercive magnetic area, however, is not configured to magnetically reverse the low-coercive magnetic material of the combined magnetic area or the low-coercive magnetic material of the low-coercive magnetic area. Likewise, the high-coercive magnetic material of the combined magnetic area is not configured to magnetically reverse the low-coercive magnetic material of the combined magnetic area or the low-coercive magnetic material of the low-coercive magnetic area. This results from the fact that the magnetic field strength which the respective high-coercive magnetic material generates at the place of the low-coercive magnetic material is smaller than the coercive field strength of the respective low-coercive magnetic material.

In a specific embodiment, the remanent flux density of the high-coercive magnetic area and the one of the low-coercive magnetic area are equal. Furthermore, the remanent flux density of the high-coercive magnetic material of the combined magnetic area is for example half the remanent flux density of the high-coercive magnetic area and the remanent flux density of the low-coercive magnetic material of the further magnetic area is half the remanent flux density of the low-coercive magnetic area. For the combined magnetic area there arises a resulting remanent flux density from the sum of the two remanent flux densities of the high-coercive and of the low-coercive magnetic material of the combined magnetic area. In particular, the resulting remanent flux density of the combined magnetic area is preferably equal to the remanent flux density of the high-coercive magnetic area and equal to the remanent flux density of the low-coercive magnetic area.

For checking the document of value the following steps are carried out: The document of value or the security element of the document of value is magnetized by a first magnetic field, the magnetic field strength thereof being greater than the first and than the second coercive field strength. The magnetization of the high-coercive magnetic material (of both the high-coercive and the combined magnetic area) and the magnetization of the low-coercive magnetic material (of both the low-coercive and the combined magnetic area) here are uniformly aligned in a first magnetization direction. After this first magnetizing, first magnetic signals of the security element are detected by a first magnetic detector. Then the document of value or the security element is magnetized by a second magnetic field whose magnetic field strength is smaller than the first coercive field strength but is greater than the second coercive field strength. The magnetization of the high-coercive magnetic material (of both the high-coercive and the combined magnetic area) here remains aligned unchanged in the first magnetization direction. The second magnetic field is oriented such that the magnetization of the low-coercive magnetic material (of both the low-coercive and the combined magnetic area) is aligned antiparallel to the first magnetization direction. For example, the second magnetic field extends antiparallel to the first magnetic field. After this second magnetizing, second magnetic signals of the security element are detected by the first or by a second magnetic detector. In the embodiments, the second magnetic signals are detected by a second magnetic detector, which is constructed identically to e.g. the first magnetic detector. Alternatively, the second magnetic signals can also be detected by the first, i.e. by the same magnetic detector as the first magnetic signals.

Furthermore, the first and the second magnetic signals are analyzed, in order to ascertain at which positions on the security element there are localized the magnetic areas of the security element, and to identify each of the magnetic areas of the security element either as one of the combined magnetic areas or as one of the high- or low-coercive magnetic areas. Since the first magnetic field magnetizes all magnetic areas of the security element in a first magnetization direction, from the first magnetic signal there can be ascertained at which positions on the security element there are localized magnetic areas.

Since the magnetic field strength of the second magnetic field is lower than the first coercive field strength, the high-coercive magnetic areas are not magnetically reversed by the second magnetic field. When using identically constructed or identical magnetic detectors for the detection of the first and second magnetic signals, the first and the second magnetic signals of the high-coercive magnetic areas therefore are substantially equal. Since the low-coercive magnetic material is aligned, through the second magnetic field, antiparallel to the first magnetization direction, the second magnetic signal of the at least one low-coercive magnetic area respectively differs from the first magnetic signal of the at least one low-coercive magnetic area. For example, the second magnetic signal of the low-coercive magnetic area is substantially inverted in comparison to the first magnetic signal of the low-coercive magnetic area. Furthermore, the antiparallel magnetization of the low-coercive magnetic material also leads to the fact that the second magnetic signal of the at least one combined magnetic area respectively differs from the first magnetic signal of the at least one combined magnetic area and from the second magnetic signals of the high- and low-coercive magnetic areas. From the second magnetic signal of the respective magnetic area can be derived, whether the respective magnetic area is a high-coercive, a low-coercive or a combined magnetic area.

The at least one combined magnetic area is magnetized by the second magnetic field in such a way that a resulting magnetization of the at least one combined magnetic area, which arises from the second magnetizing, at least approximatively vanishes. In particular, the remanent flux densities of the low-coercive and of the high-coercive magnetic material of the at least one combined magnetic area are chosen such that through a magnetization of the high- and of the low-coercive magnetic material antiparallel to each other, there is set a vanishing resulting magnetization of the respective combined magnetic area. For example, the combined magnetic areas are configured such that the low-coercive magnetic material of the combined magnetic area and the high-coercive magnetic material of the combined magnetic area have the same remanent flux density. When in this case the low-coercive magnetic material of the combined magnetic area is magnetized, by the second magnetic field, antiparallel to the high-coercive magnetic material of the combined magnetic area, a vanishing resulting magnetization of the respective combined magnetic area is achieved. By the resulting magnetization of the combined magnetic areas almost vanishing, it is possible for the second magnetic signals of the high-coercive and of the low-coercive magnetic areas to be very reliably distinguished from the second magnetic signals of the combined magnetic areas.

The first and second magnetization direction preferably lie in the plane of the document of value. This is advantageous in comparison to a magnetization direction perpendicular to the plane of the document of value, since the magnetic material of the security element can be magnetized more easily in the plane of the document of value than perpendicular to the plane of the document of value. Through the magnetization in the plane of the document of value, thus, a more reliable check of the document of value is possible. In some embodiments, the first magnetization direction extends parallel or antiparallel to the transport direction of the document of value and the second magnetization direction opposite thereto. The first and second magnetization direction, however, may also lie in the plane of the document of value and extend perpendicular or oblique to the transport direction.

Each of the magnetic areas of the security element provides a contribution to the first and to the second magnetic signal of the security element. The contribution the respective magnetic area makes to the first or to the second magnetic signal of the security element is referred to in the following as first or second magnetic signal of the respective magnetic area. For example, the first magnetic signal or the second magnetic signal of a magnetic area are configured as first or as second magnetic-signal signature. The first and the second magnetic signal of the security element can accordingly contain a multiplicity of individual magnetic-signal signatures. The exact form of the magnetic-signal signatures, however, depends on the magnetic detector used and on the remanent flux density of the respective magnetic area and on the length of the respective magnetic area. For example, the first magnetic-signal signature of the high-coercive, of the low-coercive and of the combined magnetic areas can be respectively configured as single peak or as double peak. Upon vanishing resulting magnetization, as it can be generated with the combined magnetic areas through the antiparallel second magnetizing, the second magnetic signal of the combined magnetic area consists of a magnetic-signal amplitude which has no pronounced peaks and which remains near a second signal offset, which the second magnetic signal has.

For identifying the magnetic areas, the second magnetic signals of the magnetic areas are analyzed. Preferably, for this purpose a signal processing of the second magnetic signals is carried out, which uses two thresholds with which the respectively second magnetic signal of the respective magnetic area is compared. The two thresholds are formed by an upper threshold and by a lower threshold, the lower threshold lying below the upper threshold. With reference to a positive magnetic-signal amplitude of the second magnetic signal, this means that the upper threshold lies at a greater magnetic-signal amplitude than the lower threshold. Upon identifying the magnetic areas, all those magnetic areas whose second magnetic signal neither exceeds the upper threshold nor undershoots the lower threshold are identified as combined magnetic areas. Furthermore, each magnetic area whose second magnetic signal exceeds the upper threshold or whose second magnetic signal undershoots the lower threshold is identified as high- or low-coercive magnetic area. The length of the individual magnetic areas along the longitudinal direction of the security element can be determined e.g. from the width of the second magnetic signal of the respective magnetic area or from a signal derived from the second magnetic signal or from a signal derived from the first and second magnetic signal of the respective magnetic area.

Since the magnetic-signal signatures of the high- and low-coercive magnetic areas can be differently configured depending on the type of the magnetic detector used, the decision whether a magnetic area is identified as high-coercive or as low-coercive magnetic area also depends on the type of the magnetic detector. With some magnetic detectors the second magnetic signal of the high-coercive magnetic areas is respectively configured as positive single peak and the second magnetic signal of the low-coercive magnetic areas respectively as negative single peak. In this case each magnetic area whose second magnetic signal exceeds the upper threshold is identified as high-coercive magnetic area and each magnetic area whose second magnetic signal undershoots the lower threshold as low-coercive magnetic area. In one embodiment, the second magnetic signal of the high-coercive and of the low-coercive magnetic areas is respectively configured as double peak, whereby the double peak of the low-coercive magnetic area is configured inversely to the double peak of the high-coercive magnetic area. For distinguishing the high-coercive from the low-coercive magnetic areas, in this case, additionally the signal form of the second magnetic signals of the high-coercive and of the low-coercive magnetic areas are analyzed.

The second magnetic signal of the security element has a second signal offset. The second magnetic signals of the magnetic areas are configured relative to this second signal offset. The upper threshold is defined such that it lies above the second signal offset, and the lower threshold is defined such that it lies below the second signal offset. Upon identifying the magnetic areas, all those magnetic areas whose second magnetic signal neither exceeds the upper threshold lying above the second signal offset nor undershoots the lower threshold lying below the second signal offset are identified as combined magnetic areas. By the upper and lower threshold being disposed on sides of the second signal offset opposing each other, the comparison of the second magnetic signal with these two thresholds leads to a very reliable distinction between the combined magnetic areas and the high- and low-coercive magnetic areas.

For identifying the magnetic areas, there can also be used, instead of the second magnetic signal, a signal derived from the second magnetic signal or a signal which has been derived from the second or from the first and second magnetic signal. The derived signal can be derived from the second magnetic signal e.g. by forming a correlation of the second magnetic signal with a base signal which is characteristic for the magnetic detector which detects the second magnetic signal and for the security element to be checked. The derived signal may correspond to e.g. the maximum value of a correlation curve, which has been determined for each position along the longitudinal direction of the security element. But also other characteristics of the correlation curve can be used. The derived signal, however, can also directly be the maximum value of the second magnetic signal, which the second magnetic detector detects at the respective position along the longitudinal direction of the security element. The derived signal, however, can also be the area under the second magnetic signal at the respective position along the security element or other characteristics of the second magnetic signal or characteristics of a signal which has been derived from the first and second magnetic signal.

Upon the use of a derived signal for the identification of the magnetic areas, each magnetic area, for which a signal derived from its second magnetic signal or for which a signal derived from its first and its second magnetic signal neither exceeds an upper threshold nor undershoots a lower threshold, is identified as combined magnetic area. And each magnetic area, for which a signal derived from its second magnetic signal or for which a signal derived from its first and its second magnetic signal exceeds the upper threshold and/or undershoots the lower threshold, is identified either as high-coercive or as low-coercive magnetic area.

In order to optimize the identification of the combined magnetic areas, the upper and lower threshold preferably are defined such that the two thresholds have a relatively great distance from each other. The distance between the upper and the lower threshold is in particular at least 50%, preferably at least 75%, and in particular at least 100% of an average signal swing H2 (see FIG. 2) of the second magnetic signal, which the second magnetic signal of the high-coercive and/or the second magnetic signal of the low-coercive magnetic areas have relative to the second signal offset of the second magnetic signal. The average signal swing can be determined e.g. from empirical values, which are set upon the calibration of the second magnetic detector prior to the check of the document of value. Alternatively, the average signal swing can also be ascertained, quasi-online, from the second magnetic signal, e.g. by averaging the signal swing of the individual magnetic-signal signatures of the high-coercive and/or of the low-coercive magnetic areas, which are contained in the second magnetic signal.

In some embodiments, the upper and/or the lower threshold are chosen in dependence on the first magnetic signal of the security element, in particular in dependence on a signal swing of the first magnetic signal, which the first magnetic signal has relative to a first signal offset. Thus, one can react e.g. to transport fluctuations of the document of value or manufacturing-related fluctuations of the quantity of magnetic material in the magnetic areas.

The upper threshold and/or the lower threshold can here be chosen to be the same for all magnetic areas, so that all second magnetic signals of the magnetic areas are compared with the same upper and the same lower threshold which, however, is dynamically chosen in dependence on the first magnetic signal of the security element. If the signal swing of the first magnetic signals of the magnetic areas of the security element is for example on average relatively high or low, then the upper threshold is accordingly increased or reduced.

Alternatively, for the magnetic areas of the security element there can also be chosen different upper thresholds or different lower thresholds, so that the second magnetic signals of the magnetic areas are compared with different upper or with different lower thresholds. In particular, for at least one of the magnetic areas the upper and/or the lower threshold is chosen individually, in dependence on the first magnetic signal of the respective magnetic area, in particular in dependence on a signal swing of the first magnetic signal of the respective magnetic area, which the first magnetic signal of the respective magnetic area has relative to a first signal offset of the first magnetic signal. It is particularly advantageous to choose the upper and/or the lower threshold individually for all magnetic areas of the security element, in dependence on the signal swing of the first magnetic signal of the respective magnetic area. If the signal swing of the first magnetic signal of a magnetic area is for example lower than a stored reference signal swing, then the upper threshold for this magnetic area is reduced, too. Through the individual choice of the upper or lower threshold, the upper or the lower threshold is individually adjusted to the respective magnetic area and its constitution, e.g. its length and quantity of magnetic material. In this way, for each magnetic area an optimum position of the upper and lower threshold is achieved. The distinction between the combined magnetic areas and the high- and low-coercive magnetic areas is still further improved thereby.

The invention furthermore relates to an apparatus for checking a document of value which has a security element with several magnetic areas which have at least one high-coercive, at least one low-coercive and at least one combined magnetic area. The apparatus has a first magnetic detector for detecting first magnetic signals of the security element. The apparatus also has a magnetic detector for detecting second magnetic signals of the security element, whereby this magnetic detector either is the first magnetic detector or a second magnetic detector, which e.g. is constructed identically to the first magnetic detector. The first and the second magnetic detector can be formed by one or several inductive elements, by Hall elements or by conventional magneto-resistive elements, GMR, AMR, TMR, SdT or spin-valve elements.

The apparatus further contains a signal processing device which is adapted to analyze the first and the second magnetic signals. The signal processing device is adapted to ascertain at which positions on the security element there are localized magnetic areas of the security element, and to identify these magnetic areas. Upon identifying, each of the magnetic areas of the security element is identified either as one of the combined magnetic areas, which has both the high-coercive and the low-coercive magnetic material, or as one of the high- or of the low-coercive magnetic areas, i.e. as one of the remaining magnetic areas the security element can have. The signal processing device is adapted to identify all those magnetic areas whose second magnetic signal neither exceeds an upper threshold nor undershoots a lower threshold as combined magnetic areas. The upper threshold here lies above the second signal offset and the lower threshold below the second signal offset. In particular, the upper and/or the lower threshold can either be stored in the signal processing device or be dynamically generated by the signal processing device. Here, the upper and lower threshold can be chosen according to the above explanations.

In one embodiment, the apparatus furthermore has a first and a second magnetization device, which are components of the apparatus. The first magnetization device of the apparatus is configured to provide a first magnetic field which is configured for the first magnetizing of the security element. The second magnetization device is configured to provide a second magnetic field which is configured for the second magnetizing of the security element. The first and second magnetic field can be provided e.g. by permanent magnets or by electromagnets. The first magnetic field provided by the first magnetization device is adapted for the first magnetizing of the high-coercive and of the low-coercive magnetic material in a first magnetization direction, whereby the magnetic field strength of the first magnetic field used for the first magnetizing is greater than the first coercive field strength. The first magnetization device is disposed such that upon the operation of the apparatus, for each of the magnetic areas the first magnetizing is carried out before the first magnetic signal of the respective magnetic area is detected. The second magnetic field provided by the second magnetization device is adapted for the second magnetizing of the low-coercive magnetic material in a second magnetization direction which extends antiparallel to a first magnetization direction. The magnetic field strength used for the second magnetizing is smaller than the first coercive field strength, but greater than the second coercive field strength. The magnetization of the high-coercive magnetic material remains aligned, upon the second magnetizing, in the first magnetization direction. The second magnetization device is disposed such that upon the operation of the apparatus, for each of the magnetic areas the second magnetizing is carried out after the first magnetic signal has been detected and before the second magnetic signal of the respective magnetic area is detected. In particular, the magnetic field direction of the second magnetic field extends antiparallel to the magnetic field direction of the first magnetic field.

In a different embodiment, the first magnetization device is not component of the apparatus, but is formed by an external magnetization device which is disposed outside the apparatus and provides the first magnetic field. For example, as an external magnetization device a permanent magnet or an electromagnet can be used, past which the document of value is manually or automatically guided in order to carry out the first magnetizing of the security element. The external magnetization device provides a magnetic field strength which is greater than the first coercive field strength, so that all magnetic areas can be magnetized in the first magnetization direction. The second magnetization device in this embodiment can be executed, as described above, as component of the apparatus.

Alternatively, the second magnetization device can be formed by an external magnetization device which is disposed outside the apparatus and provides the second magnetic field. For the second magnetizing, for example a permanent magnet or an electromagnet is used, past which the document of value is manually or automatically guided in order to carry out the second magnetizing of the security element. The external magnetization device provides a second magnetic field strength, which lies between the first and the second coercive field strength, so that the low-coercive magnetic material can be magnetically reversed in the antiparallel direction. The first magnetization device in this embodiment can either be executed as component of the apparatus or, likewise, as external magnetization device. In the latter case, the first and second magnetization device can be executed as two separate external magnetization devices or as one combined external magnetization device which provides both the first and the second magnetic field.

DESCRIPTION OF THE DRAWINGS

In the following, the invention is explained by way of example with reference to the following Figures.

DETAILED DESCRIPTION OF EXEMPLARY EMBODIMENTS

Figure 1:
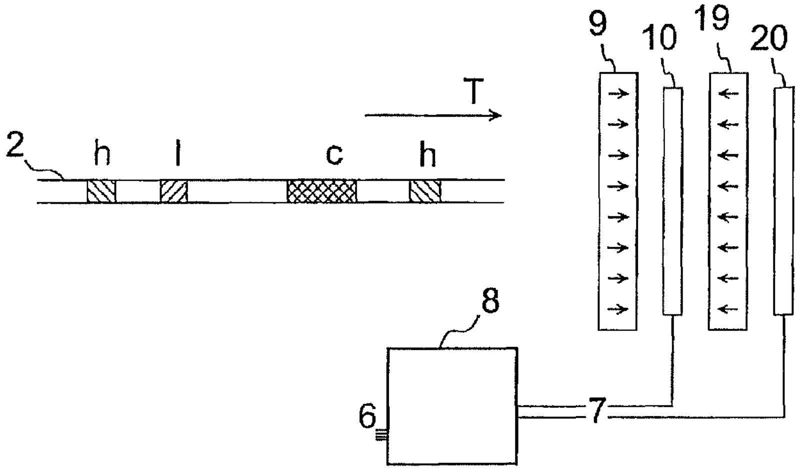
FIG. 1 shows an apparatus for checking a security element, with two magnetization devices and two magnetic detectors, which are oriented perpendicular to the transport direction of the security element and perpendicular to the security element.

In FIG. 1 there is schematically represented an apparatus for checking the magnetic properties of a document of value, in which a document of value, which contains a security element 2, is transported along a transport direction T past the apparatus (document of value not shown). The apparatus is configured to check a security element 2 which extends parallel to the transport direction T of the document of value. The apparatus can be component of a machine for processing documents of value with which documents of value are checked as to authenticity, type and/or state, in particular a magnetic sensor which can be installed in such a machine The apparatus can also be an autonomous measuring apparatus for checking the magnetic properties of documents of value. The security element 2 in this example is configured as a security thread which contains along its longitudinal direction a first high-coercive magnetic area h, a combined magnetic area c, a low-coercive magnetic area l and a second high-coercive magnetic area h. Between these magnetic areas h, l, c, h there is located non-magnetic material. The high-coercive and the low-coercive magnetic material of the combined magnetic area c have the same remanent flux density.

The apparatus has a first magnetization device 9 and a second magnetization device 19, which provide a magnetic field parallel or antiparallel to the transport direction T of the document of value. The first magnetization device in this example is configured for the first magnetizing of the security element 2 parallel to the transport direction T and the second magnetization device 19 for the second magnetizing of the security element 2 antiparallel to the transport direction T. Alternatively, the security element 2 can also first be magnetized antiparallel and then parallel to the transport direction T. The apparatus also contains a first magnetic detector 10, which is disposed between the two magnetization devices 9, 19, and a second magnetic detector 20 which, upon viewing in transport direction T, is disposed downstream of the two magnetization devices 9, 19. The two magnetic detectors 10, 20 are oriented perpendicular to the longitudinal direction of the security element 2 and possess a detection element which is configured to detect at least magnetic fields parallel and antiparallel to the transport direction T.

The apparatus further has a signal processing device 8 which is connected with the first and the second magnetic detector 10, 20 via the lines 7. The signal processing device 8 receives measuring signals from the two magnetic detectors 10, 20 and processes and analyzes these. The signal processing device 8 can be disposed e.g. together with the magnetic detectors 10, 20 in the same housing. Via an interface 6 data can be sent outward by the signal processing device 8, e.g. to a control device which further processes the data and/or to a display device which informs about the result of the check of the document of value. In the following embodiments, the same elements have the same reference signs.

Figure 2:
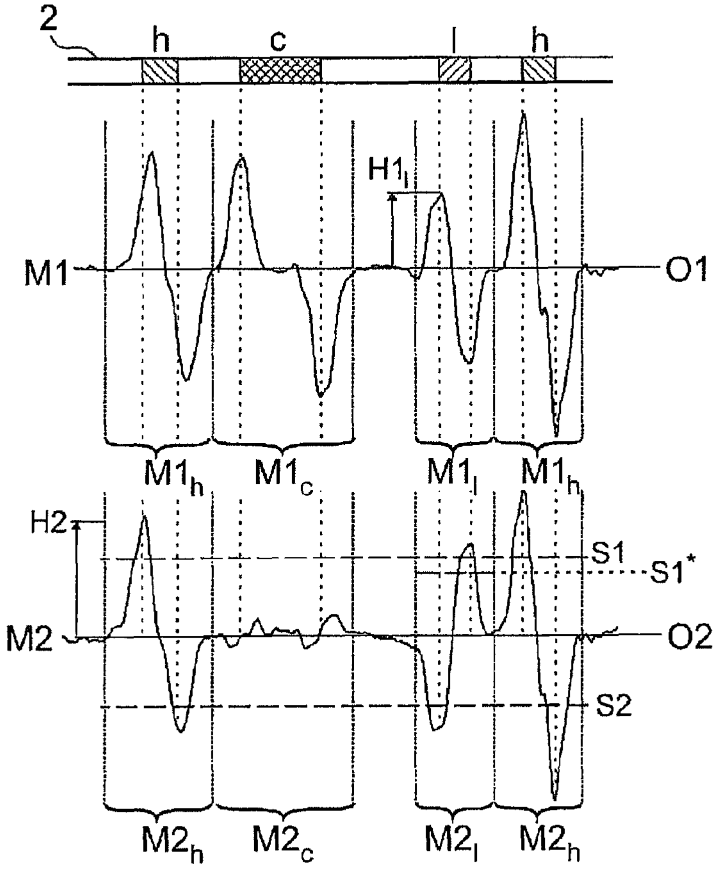
FIG. 2 shows a first and second magnetic signal of the security element, obtained with the aid of the apparatus of FIG. 1.

In FIG. 2 there are represented, by way of example, the magnetic signals of the security element 2 as a function of time, which arise upon the transport of the security element 2 past the apparatus shown in FIG. 1. By the first magnetic detector 10 there is detected the first magnetic signal M1 of the security element 2. The first magnetization device 9 generates, parallel to the transport direction T, a first magnetic field with high magnetic field strength through which, when the security element 2 is transported past, all magnetic areas h, c, l are magnetized parallel to the transport direction T. The first magnetic signal M1 shows, for all magnetic areas h, l, c, h, at the beginning of the magnetic area a magnetic-signal signature which consists of a positive peak at the beginning and of a negative peak at the end of a magnetic area ($\mathbf{M1}_h$, $\mathbf{M1}_c$, $\mathbf{M1}_l$). By the second magnetization device 19 there is generated a magnetic field with lower field strength, whose direction extends antiparallel to the first magnetic field of the first magnetization device 9. The field strength is dimensioned such that only the low-coercive magnetic material is magnetically reversed, while the magnetization of the high-coercive magnetic material is retained. Therefore, the low-coercive magnetic area l and the low-coercive material of the combined magnetic area c are magnetically reversed in the antiparallel direction. The two high-coercive magnetic areas h and the high-coercive material of the combined magnetic area c further remain magnetized in the first magnetization direction. Upon the following measurement with the second magnetic detector 20, the second magnetic signal M2 of the security element 2 is detected. The second magnetic signals $\mathbf{M2}_h$ of the high-coercive magnetic areas h show the same magnetic-signal signature as the first magnetic signals $\mathbf{M1}_h$ of the high-coercive magnetic areas h. Since the low-coercive magnetic materials were magnetically reversed antiparallel, the second magnetic signal $\mathbf{M2}_1$ of the low-coercive magnetic area 1 shows a magnetic-signal signature which is inverse to the magnetic-signal signatures observed in the first magnetic signal, and which is also inverse to the magnetic-signal signature of the high-coercive magnetic areas h observed in the second magnetic signal (negative peak at the beginning, positive peak at the end of the magnetic area l). For the combined magnetic area c there arises a greatly reduced magnetic signal M2, which, relative to a second signal offset O2 of the second magnetic signal M2, has an almost vanishing signal amplitude. Since the magnetization of the high-coercive magnetic material of the combined magnetic area c and the magnetization (antiparallel thereto) of the low-coercive magnetic material of the combined magnetic area c are oppositely equal (and quasi cancel each other out), there arises therefrom a resulting magnetic signal $\mathbf{M2}_c$ of the combined magnetic area with an almost vanishing signal amplitude.

From the first and second magnetic signal M1, M2 the signal processing device 8 ascertains at which positions on the security element 2 there are present magnetic areas. This can be derived e.g. already alone from the first magnetic signal M1, e.g. by analyzing at which positions on the security element 2 the magnetic-signal signature is to be found, which is expected for the magnetic areas after the first magnetizing (here a double peak). Furthermore, the signal processing device 8 is adapted to ascertain for each of the found magnetic areas the type of the respective magnetic area. For this purpose, two thresholds S1 and S2 are used with which the second magnetic signal M2 is compared. The upper threshold S1 is chosen such that it lies above the second signal offset 02 of the second magnetic signal M2, and the lower threshold S2 is chosen such that it lies below the second signal offset O2 of the second magnetic signal M2. When the comparison with the two thresholds S1, S2 for one of the found magnetic areas yields that the second magnetic signal of the respective magnetic area neither exceeds the upper threshold 51 nor undershoots the lower threshold S2, then this magnetic area is identified as combined magnetic area c. Each magnetic area whose second magnetic signal exceeds the upper threshold S1 and/or undershoots the lower threshold S2 is identified as high-coercive or low-coercive magnetic area. For distinguishing between the high-coercive and the low-coercive magnetic areas, moreover, the respective magnetic-signal signature of the second magnetic signal $M2_h$, $M2_l$ of these magnetic areas is analyzed as to whether first a positive and then a negative peak has been detected (high-coercive magnetic areas h) or vice versa (low-coercive magnetic area l). Upon the inversion of the magnetic field directions of the magnetization devices 9, 19, or upon the use of other magnetic detectors it may be the case that the assignment of the high- and low-coercive magnetic areas must be effected exactly vice versa.

With the aid of this method a magnetic coding of the security thread 2 of high-coercive, low-coercive and combined magnetic areas can be reliably established. Optionally, here the upper and/or the lower threshold 51, S2 can be chosen in dependence on the first magnetic signal M1 of the security element 2. For example, the upper threshold 51, with which the second magnetic signal $M2_1$ of the low-coercive magnetic area l is compared, can be reduced, individually for the low-coercive magnetic area l, to the first threshold S1*, while the second magnetic signals of the remaining magnetic areas h, c, h are compared with the threshold 51. Thus, the first threshold can be individually adjusted to the relatively low signal swing $H1_1$, which the first magnetic signal $M1_1$ of the low-coercive magnetic area 1 has relative to the first signal offset O1 of the first magnetic signal M1.

Figure 3:
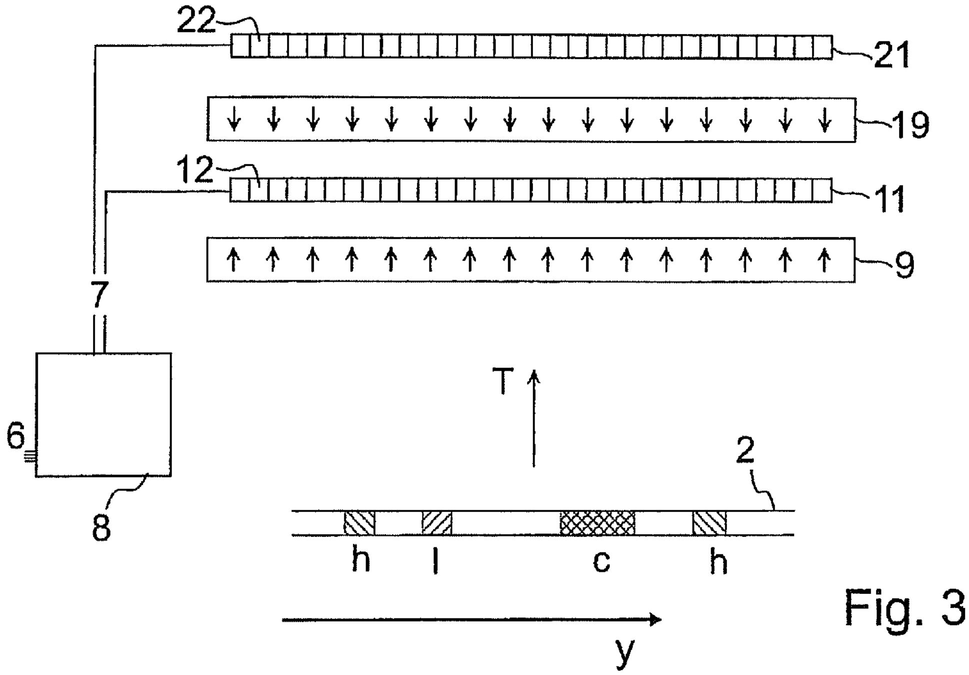
FIG. 3 shows an apparatus for checking a security element, with two magnetization devices and two magnetic detectors, which are oriented perpendicular to the transport direction of the security element and parallel to the security element.

In FIG. 3 there is outlined a further embodiment, in which the security element 2 is transported such that its longitudinal direction is oriented perpendicular to the transport direction T of the document of value. In order to obtain a spatial resolution along the security element 2 (y-direction), as first and second magnetic detector there are used a first detector line 11 and a second detector line 21, which respectively have a plurality of individual detection elements 12, 22. Each of these detection elements 12, 22 delivers a magnetic signal, so that in this example a plurality of first magnetic signals M1 are detected with the aid of the detection elements 12 and a plurality of second magnetic signals M2 with the help of the detection elements 22. Each detection element 12 of the first detector line 11 captures the same section of the transported security element 2 as a detection element 22 of the second detector line 21 corresponding thereto. The signal processing can be effected e.g. analogous to the embodiment of FIGS. 1 and 2, whereby respectively the magnetic signals of two corresponding detection elements 12, 22 are processed as first and second magnetic signal.

Figure 4:
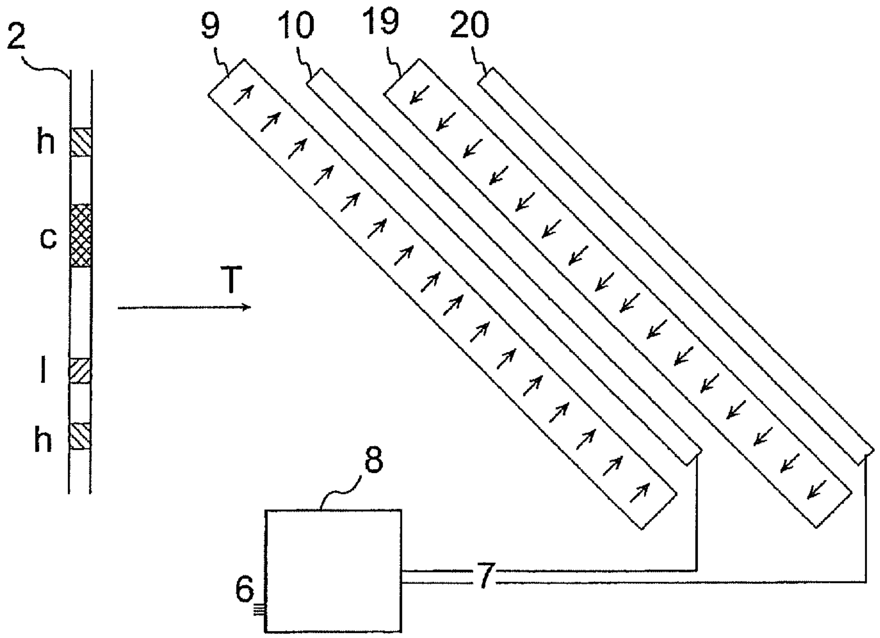
FIG. 4 shows an apparatus for checking a security element, with two magnetization devices and two magnetic detectors, which are oriented obliquely to the transport direction of the security element and obliquely to the security element.

In FIG. 4 there is outlined a further embodiment, in which the security element 2 is transported, as in FIG. 3, with its longitudinal direction perpendicular to the transport direction T. In contrast to the embodiment of the FIGS. 1 and 2, in this embodiment the magnetic detectors 10, 20 and the magnetization devices 9, 19 are oriented obliquely to the transport direction T of the security element 2. Through the oblique position, a spatial resolution can be achieved even without the use of elaborate detector lines. The two detection elements of the magnetic detectors 10, 20 detect the first or the second magnetic signal, analogous to the example of the FIGS. 1 and 2, as a function of time.

Figure 5:
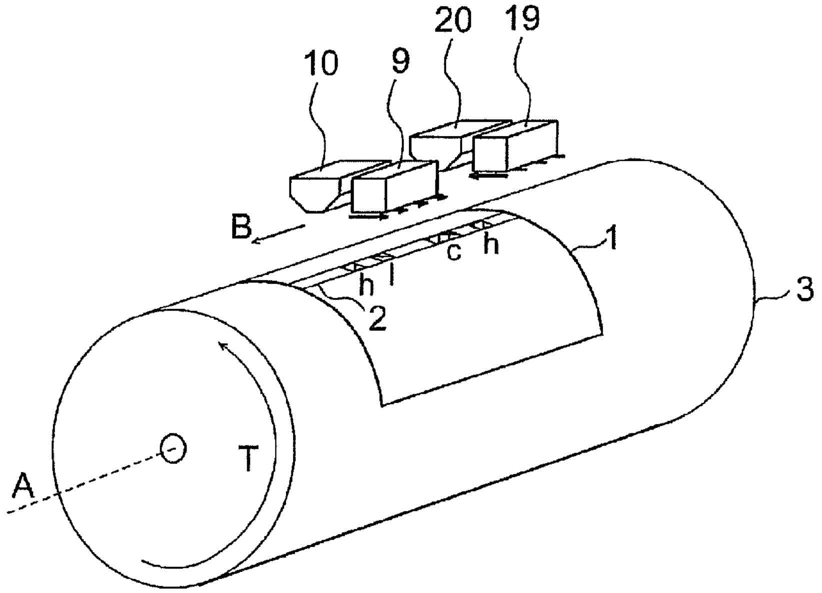
FIG. 5 shows a three-dimensional representation of an apparatus for checking a security element, in which the document of value rotates on a drum and in which the two magnetization devices and two magnetic detectors are moved parallel to the security element over the rotating document of value.
Figure 6:
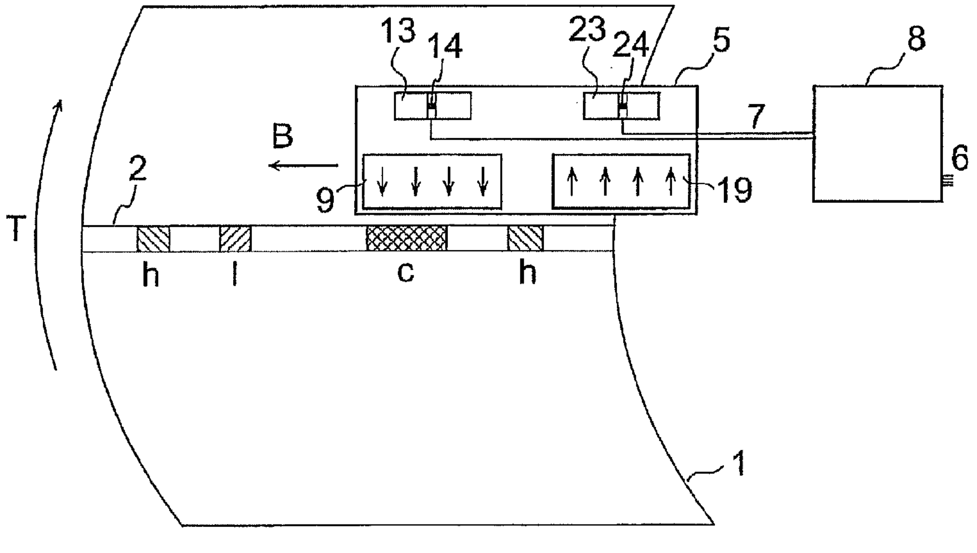
FIG. 6 shows plan view onto the apparatus of FIG. 5.

The FIGS. 5 and 6 show a further embodiment, in which the apparatus is configured as an autonomous measuring apparatus which is configured to check the magnetic properties of individual documents of value 1. In contrast to the embodiment of the FIGS. 1 and 2, in this embodiment the second magnetization device 19 and the second magnetic detector 23 are disposed beside the first magnetization device 9 and the first magnetic detector 13. The two magnetic detectors 13, 23 and the two magnetization devices 9, 19 are mounted on a scan device 5, which is transportable along the direction B and is disposed at a short distance from the drum 3. The magnetic detectors 13, 23 have on their undersides respectively one magnetic-field-sensitive area 14, 24. The document of value 1 is attached to a drum 3 which is rotatable around the axis A which extends parallel to the direction B. Through the rotation of the drum 3, the document of value 1 can be repeatedly transported along the circumference of the drum 3 past the magnetic detectors 13, 23 and the magnetization devices 9, 19. Upon each rotation, the magnetic signals of those sections of the security element 2 can be detected, which, depending on the position of the scan device 5, are located at that moment in the detection area of the magnetic detectors 13 or 23. By slowly moving the scan device 5 along the direction B and a simultaneous fast rotation of the drum 3, the magnetic areas h, l, c of the security element 2 are, as in the previous embodiments, successively magnetized two times, and respectively thereafter there are detected their magnetic signals. In FIG. 6 the apparatus is represented at a time during a rotation, upon which the combined magnetic area c is magnetized by the first magnetization device 9 and the first magnetic signals $M1_c$ of the combined magnetic area c is detected with the aid of the magnetic detector 13. The high-coercive and low-coercive magnetic areas h, l are located, upon this rotation, outside the detection area of the two magnetic detectors 13, 23. As an alternative to the arrangement shown in the FIGS. 5 and 6, the document of value 1 can also be attached to the drum 3 such that the security element 2 is oriented not perpendicular, but parallel to the transport direction T of the document of value. In this case, analogous to the embodiment of FIG. 1, the first and second magnetic signal are respectively detected as a function of time, first by the first and then by the second magnetic detector.

Figure 7:
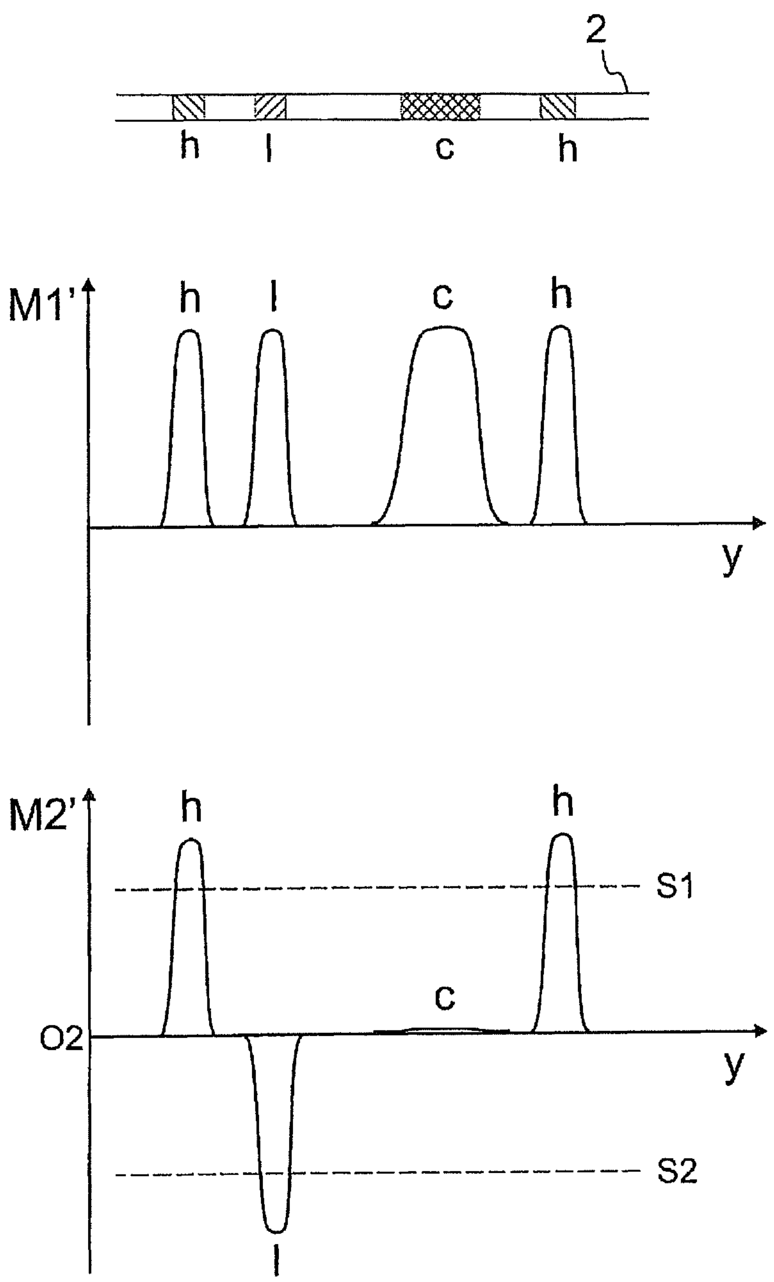
FIG. 7 shows the identification of the magnetic areas using a signal derived from the second magnetic signal.

For identifying the magnetic areas, the first and second magnetic signals M1, M2 of the security element 2, in particular in the embodiments of the FIGS. 3 and FIGS. 5 and 6, can also be processed in the following manner: From the first magnetic signal M1 there is first derived a first signal M1' and from the second magnetic signal M2 there is derived a second signal MT. In FIG. 7 there are shown examples of such a derived first and second signal M1', M2'. The derived first signal M1' shown in FIG. 7 has been derived from the first magnetic signal M1 of the magnetic detector 10 through forming a correlation of the first magnetic signal M1 with a base signal which is characteristic for the magnetic detector 10, 11 used and the security element 2 to be checked. The derived first signal M1' shown n FIG. 7 corresponds to the maximum value of the correlation curve which has been determined for each position y along the longitudinal direction of the security element 2. But also other characteristics of the correlation curve can be used. Analogously, the derived second signal M2' has been derived from the second magnetic signal M2 of the magnetic detector 20, 21 through forming a correlation of the second magnetic signal M2 with a base signal which is characteristic for the magnetic detector 20, 21 used and the security element 2.

As a derived first signal M1', however, there can also be used e.g. the maximum value of the first magnetic signal M1, which the first magnetic detector 10, 11 or the individual detection elements 12 thereof detect at the respective y-position of the security element 2. As a derived first signal M1' there can also be used the area under the first magnetic signal M1 at the respective y-position of the security element 2, or also other characteristics of the first magnetic signal M1. The derived second signal M2' is derived from the second magnetic signal M2 analogous to the deriving of the derived first signal M1' from the first magnetic signal M1.

The derived second signal M2' may have been derived either from the second magnetic signal M2 alone, or from the first and the second magnetic signal M1, M2. In the latter case, for example there is first determined respectively the maximum value or the area of the first and second magnetic signal M1, M2 or respectively a correlation value of the first and of the second magnetic signal M1, M2 with the base signal, and then the derived second signal M2' is derived therefrom, e.g. by a linear combination or formation of a ratio. For example, the derived second signal M2' is derived by adding or subtracting the maximum values of the first M1 and the second magnetic signal M2 at the respective y-position, or by adding or subtracting the correlation values of the first and of the second magnetic signal at the respective y-position.

The derived second signal M2' is then compared with an upper threshold S1 and a lower threshold S2 in order to identify the magnetic areas h, l, c. When the comparison with the two thresholds S1, S2 yields for one of the found magnetic areas h, l, c that the derived second signal M2' of the respective magnetic area neither exceeds the upper threshold S1 nor undershoots the lower threshold S2, this magnetic area is identified as combined magnetic area c, cf. FIG. 7. Upon exceeding the upper threshold S1, the respective magnetic area is identified as high-coercive magnetic area h and upon undershooting the lower threshold as low-coercive magnetic area l.

The invention claimed is:

1. A method for checking a document of value which has a security element with several magnetic areas, wherein the several magnetic areas of the security element have at least one high-coercive magnetic area which contains a high-coercive magnetic material with a first coercive field strength and at least one low-coercive magnetic area which contains a low-coercive magnetic material with a second coercive field strength which is lower than the first coercive field strength and at least one combined magnetic area which contains both the high-coercive and the low-coercive magnetic material, comprising the steps:

first magnetizing of the security element by a first magnetic field whose magnetic field strength is greater than the first coercive field strength, so that the magnetization of the high-coercive magnetic material and the magnetization of the low-coercive magnetic material are aligned in a first magnetization direction, detecting of first magnetic signals of the security element by a first magnetic detector, second magnetizing of the security element by a second magnetic field whose magnetic field strength is smaller than the first coercive field strength but is greater than the second coercive field strength, wherein the second magnetic field is oriented such that the magnetization of the low-coercive magnetic material through the second magnetizing is aligned antiparallel to the first magnetization direction, detecting of second magnetic signals of the security element by the first magnetic detector or by a second magnetic detector, analyzing of the first and the second magnetic signals of the security element, in order to ascertain at which positions on the security element there are localized the magnetic areas of the security element and in order to identify each of the magnetic areas either as one of the combined magnetic areas or as one of the high- or low-coercive magnetic areas.

2. The method according to claim 1, wherein the at least one combined magnetic area is magnetized by the second magnetic field such that a resulting magnetization of the at least one combined magnetic area, which arises from the second magnetizing, at least approximatively vanishes.

3. The method according claim 1, wherein the at least one combined magnetic area is configured such that the high-coercive magnetic material of the combined magnetic area and the low-coercive magnetic material of the combined magnetic area have substantially the same remanent flux density, wherein the combined magnetic area contains equal quantities of the high-coercive and of the low-coercive magnetic material.

4. The method according to claim 1, wherein each magnetic area whose second magnetic signal or a signal derived from its second magnetic signal or a signal derived from its first and its second magnetic signal neither exceeds an upper threshold nor undershoots a lower threshold is identified as the combined magnetic area.

5. The method according to claim 1, wherein, for identifying the magnetic areas, the second magnetic signal of the respective magnetic area or a signal derived from the second magnetic signal of the respective magnetic area or a signal derived from the first and the second magnetic signal of the respective magnetic area is compared with an upper threshold and with a lower threshold.

6. The method according to claim 5, wherein each magnetic area whose second magnetic signal or a signal derived from its second magnetic signal or a signal derived from its first and its second magnetic signal exceeds the upper threshold and/ or undershoots the lower threshold is identified either as high-coercive or as low-coercive magnetic area.

7. The method according claim 5, wherein the second magnetic signal of the security element or a signal derived from its second magnetic signal or a signal derived from its first and its second magnetic signal has a second signal offset and the upper threshold lies above the second signal offset and the lower threshold lies below the second signal offset.

8. The method according to claim 5, wherein the upper threshold and the lower threshold have a distance which is at least 50% of an average signal swing, which the second magnetic signal of the high-coercive and/or of the low-coercive magnetic areas has relative to the second signal offset.

9. The method according to claim 5, wherein, for at least one of the magnetic areas the upper and/ or the lower threshold is chosen in dependence on the first magnetic signal, whereby the upper and/ or the lower threshold is chosen individually, in dependence on a first magnetic signal of the respective magnetic area.

10. An apparatus for checking a document of value which has a security element with several magnetic areas, wherein the several magnetic areas of the security element have at least one high-coercive magnetic area which contains a high-coercive magnetic material with a first coercive field strength and at least one low-coercive magnetic area which contains a low-coercive magnetic material with a second coercive field strength which is lower than the first coercive field strength, comprising:

a first magnetic detector for detecting first magnetic signals of the security element after the security element has been magnetized by a first magnetic field, whose magnetic field strength is greater than the first coercive field strength, so that the magnetization of the high-coercive magnetic material and the magnetization of the low-coercive material are aligned in a first magnetization direction, a magnetic detector for detecting second magnetic signals of the security element after the security element has been magnetized by a second magnetic field whose magnetic field strength is smaller than the first coercive field strength but is greater than the second coercive field strength, wherein the second magnetic field is oriented such that the magnetization of the low-coercive magnetic field through the second magnetizing is aligned antiparallel to the first magnetization direction, wherein said magnetic detector is either the first magnetic detector or a second magnetic detector, a signal processing device analyzing the first and the second magnetic signals, which is configured to ascertain at which positions on the security element there are localized magnetic areas of the security element, and to identify the magnetic areas of the security element, wherein each of the magnetic areas is identified either as one of the high-coercive magnetic areas or as one of the a low-coercive magnetic areas.

11. The apparatus according to claim 10, wherein the signal processing device is arranged such that for identifying the magnetic areas, the second magnetic signal of the respective magnetic area or a signal derived from the second magnetic signal of the respective magnetic area or a signal derived from the first and the second magnetic signal of the respective magnetic area is compared with an upper threshold and with a lower threshold.

12. The apparatus according to claim 10, wherein the signal processing device is arranged to identify each of the magnetic areas whose second magnetic signal or a signal derived from its second magnetic signal or a signal derived from its first and its second magnetic signal exceeds the upper threshold and/ or undershoots the lower threshold either as high-coercive or as low-coercive magnetic area.

13. The apparatus according to claim 10, wherein, upon the operation of the apparatus, the second magnetic signal of the security element or a signal derived from its second magnetic signal or a signal derived from its first and its second magnetic signal has a second signal offset and the upper threshold lies above the second signal offset and the lower threshold lies below the second signal offset.

14. The apparatus according to claim 10, wherein the signal processing device is arranged to choose for at least one of the magnetic areas the upper threshold and/ or the lower threshold in dependence on the first magnetic signal, said the signal processing device being arranged to choose for at least one of the magnetic areas the upper and/ or the lower threshold individually, in dependence on a first magnetic signal of the respective magnetic area.

15. The apparatus according to claim 10, comprising a first magnetization device which is configured to provide a first magnetic field which is arranged for the first magnetizing of the high-coercive and of the low-coercive magnetic material in a first magnetization direction, said magnetic field strength used for the first magnetizing being greater than the first coercive field strength.

16. The apparatus according to claim 10, comprising a second magnetization device which is configured to provide a second magnetic field which is arranged to perform the second magnetizing of the low-coercive magnetic material in a second magnetization direction which extends antiparallel to a first magnetization direction, so that the magnetic field strength used for the second magnetizing is smaller than the first coercive field strength, but larger than the second coercive field strength.

17. The apparatus according to claim 10, wherein the signal processing device is arranged to identify all those magnetic areas whose second magnetic signal or a signal derived from their second magnetic signal neither exceeds an upper threshold nor undershoots a lower threshold as combined magnetic areas.

18. The apparatus according to claim 10, wherein the several magnetic areas of the security element further comprises at least one combined magnetic area which contains both the high-coercive and the low-coercive magnetic material, wherein the signal processing device is configured to identify the magnetic areas of the security element, wherein each of the magnetic areas is identified either as one of the high-coercive magnetic areas or as one of the a low-coercive magnetic areas or as one of the combined magnetic areas.

* * * * *